Figure 1:
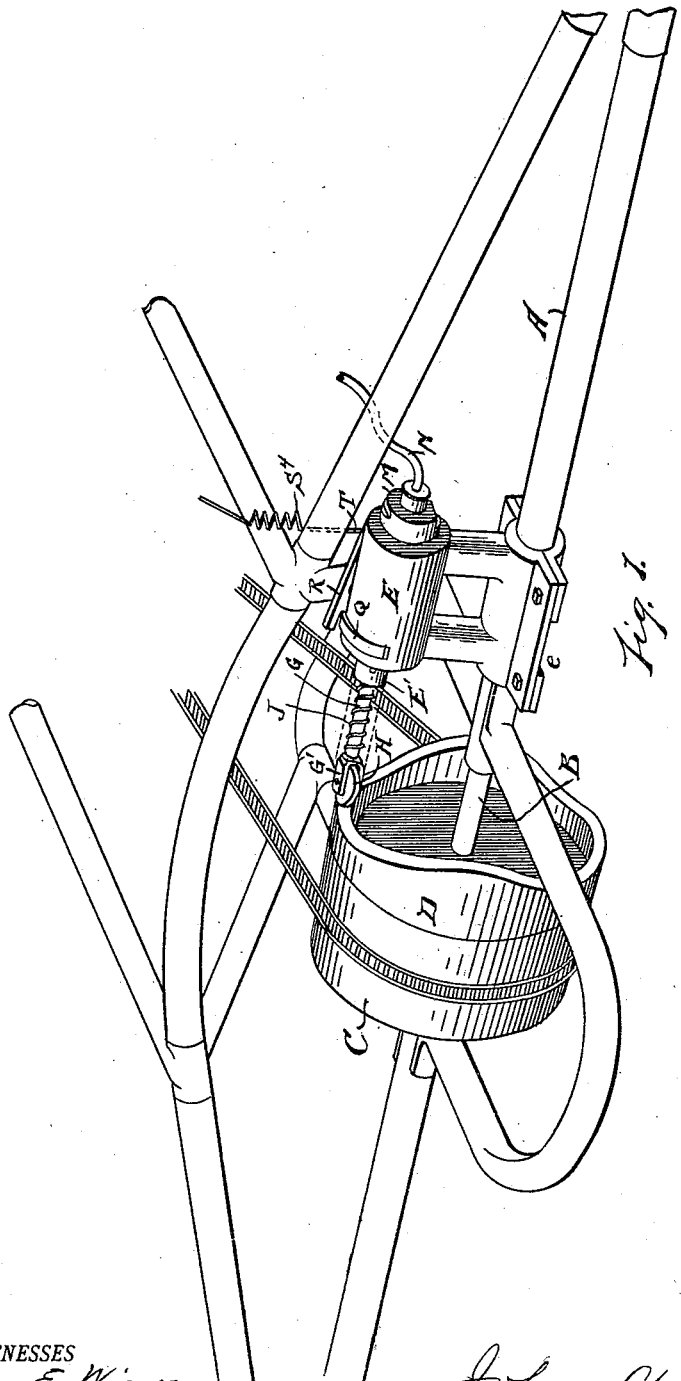

No. 706,051. Patented Aug. 5, 1902.
J. G. HEAL.
AUTOMOBILE AIR PUMP.
(Application filed Sept. 24, 1901.)
(No Model.) 3 Sheets—Sheet 1.

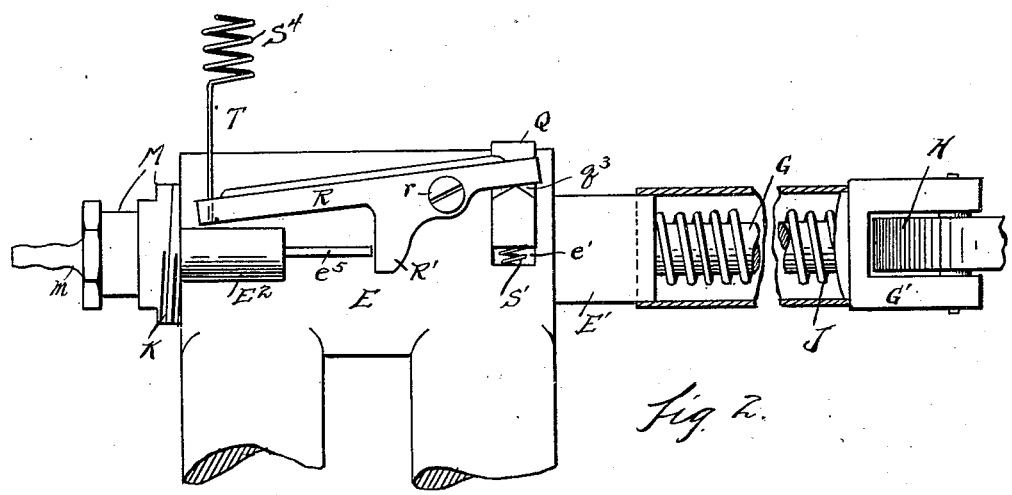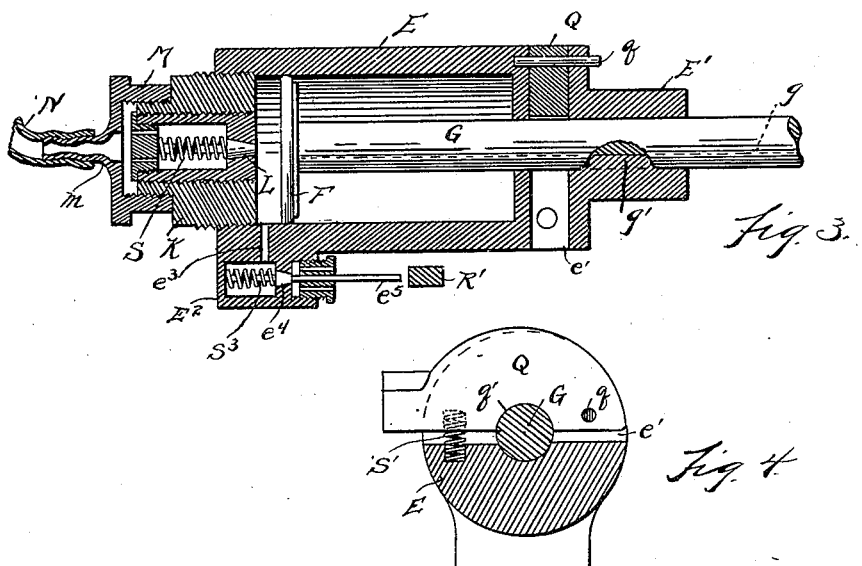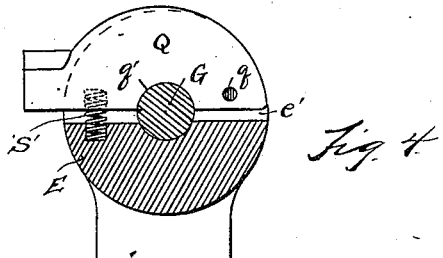

No. 706,051.  
J. G. HEAL.  
AUTOMOBILE AIR PUMP.  
(Application filed Sept. 24, 1901.)  
Patented Aug. 5, 1902.
(No Model.)  
3 Sheets—Sheet 3.
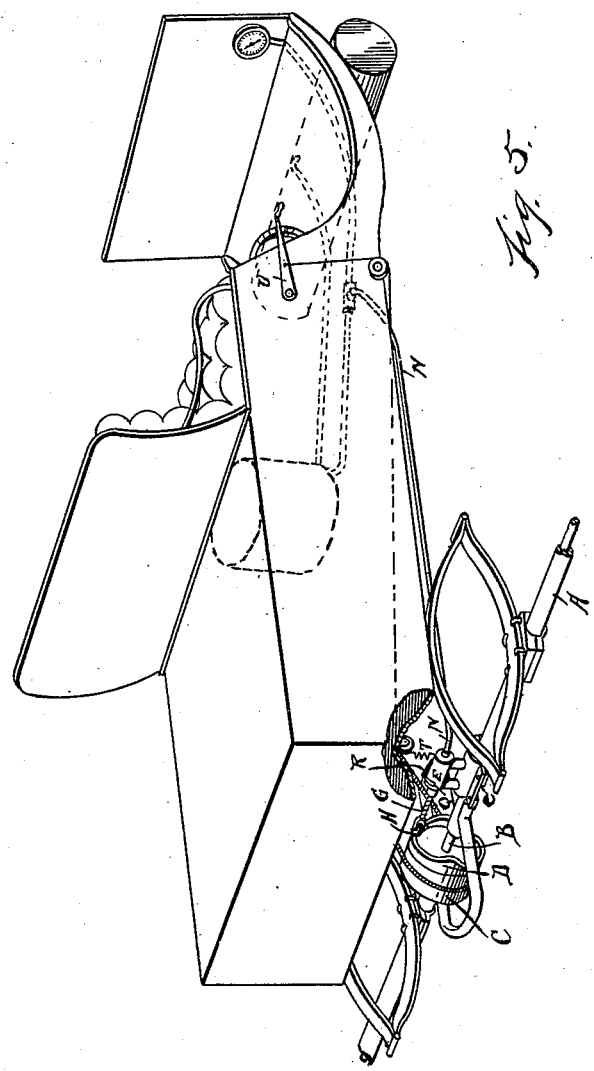
WITNESSES  
INVENTOR  
John G. Heal  
By Parker Burton  
Attorneys.

UNITED STATES PATENT OFFICE.

JOHN G. HEAL, OF DETROIT, MICHIGAN.

AUTOMOBILE AIR-PUMP.

SPECIFICATION forming part of Letters Patent No. 706,051, dated August 5, 1902.

Application filed September 24, 1901. Serial No. 76,346. (No model.)

*To all whom it may concern:*

Be it known that I, JOHN G. HEAL, a citizen of the United States, residing at Detroit, county of Wayne, State of Michigan, have invented a certain new and useful Improvement in Automobile Air-Pumps; and I declare the following to be a full, clear, and exact description of the invention, such as will enable others skilled in the art to which it pertains to make and use the same, reference being had to the accompanying drawings, which form a part of this specification.

My invention relates to air-pumps, and is especially designed to be applied to running-gear of automobiles for the purpose of supplying air to the pressure-tanks thereof; and it consists in the various combinations and arrangements hereinafter described and claimed.

In the drawings, Figure 1 is a perspective view of the pump and its attachment to the rear axle of an automobile. Fig. 2 is a side elevation of the pump proper. Fig. 3 is a vertical sectional view of Fig. 2. Fig. 4 is a cross-sectional view on the lines $x$ $x$, Fig. 3, and of the clamp for holding the pump out of action. Fig. 5 is an outline perspective view of the location of the pump on an automobile, together with a diagrammatic view of the pump connections and means for controlling the same.

Similar letters refer to similar parts.

In the drawings, A represents the rear fixed axle in an automobile, within which is usually located a live or running axle B.

C is the differential gear, which is of the usual type and being well known is not illustrated or described. To the outside of one of the gear-wheels attached to the live axle is a crown-cam D, having, preferably, two elevations and two depressions, so that for each revolution of the differential gear there are two thrusts of the cam.

E is the pump-barrel, which is clamped at $e$ upon the dead or rigid axle A in such manner that it is detachable, but fixedly mounted thereon, and the proper distance from the crown-cam D.

The pump-barrel E carries a piston of the usual form, F, and piston-rod G. The piston-rod G is prolonged and terminates in a jaw G', carrying a friction-wheel H, the parts being so arranged that the friction-wheel is adapted to come in contact with the edge of the crown-cam D. The piston-rod G, together with the friction-wheel H, is held up against the crown-cam by a spiral spring J, interposed between the jaw G' and an extension E' upon the end of the pump-barrel E, the extension being used to give a large bearing-surface for the piston-rod G. The piston-rod G is grooved, the groove being shown in dotted lines, and at the portion broken away, as $g$, and the extension E' is a feather $g'$, which engages in the groove $g$, the object of this construction being to prevent the piston-rod G from rotating, and thus throwing the friction-wheel at its end out of tangential relation to the radius of the cam-wheel. It is obvious, therefore, that on rotating the crown-cam D by any means the cam will actuate the piston-rod G, which will actuate the piston F in one direction, and that it will be retracted by the spring J, and thus follow the sinuosities of the cam as the cam rotates. Upon the end of the pump-barrel opposite to that carrying the piston-rod is a screw-plug K, carrying a check-valve L, which is controlled by a spring S. The outer end of the cap M, screwed over this plug, is formed into a nipple $m$, upon which is attached a flexible hose N. The inlet of air to the pump and past the piston F is of the usual construction. The orifice through which the piston-rod passes may be somewhat larger than the piston-rod, or perforations may be made in the cylinder-head through which the rod passes, and on the withdrawal of the piston the leather cap thereon retracts and permits air to pass by it into the clearance-space at the opposite end of the cylinder.

In the casing of the pump E there is cut a cross-slot $e'$, in which is located a curved clamp Q, pivoted at $q$. The interior of the curve at $q'$ corresponds with the curvature of the piston-rod G. As the clamp does not extend quite to the bottom of the slot, its depression would bring its curved portion in contact with the piston-rod, as shown in Fig. 4, and it is normally held from such contact by an interposed spiral spring S'. The clamp Q is controlled by a latch or lever R, pivoted at $r$, one end of which impinges upon the clamp Q at $q^3$, Fig. 2, and the other end is controlled by flexible spring attachment T.

It is obvious that the raising of the outer end of the latch R by the attachment would have the effect by the contact of its short arm with the outer end of the clamp Q to depress the clamp Q and force it into contact with the piston-rod G.

The flexible spring attachment for raising the latch is continued, as is shown in Fig. 5, to a hand-lever at the seat, (marked U,) and the raising of the outer end of this hand-lever through the medium of the parts described would bring pressure to bear upon the piston-rod G by means of the clamp Q, and this pressure is sufficient to lock the piston-rod G against the return of its outer end, and therefore to prevent the reciprocations of the pump. In order that this locking shall be effectual and shall have only the resistance of the spring J to overcome, I have devised means for releasing the air-pressure behind the piston simultaneously with the locking.

Cast to the barrel of the pump E is a hollow projection $E^2$, the space therein communicating with the clearance behind the piston F, (marked $e^3$.) Within the hollow formed in the projection $E^2$ is a spring-flanged valve $e^4$. This valve carries a stem $e^5$, passing out through an opening in the projection $E^2$. The stem is adapted to be operated to open the valve $e^4$, and thus open the clearance-space behind the piston F to the atmosphere.

Attached to the lever R is a lug R', which comes in mechanical contact with the end of the stem $e^5$, the parts being so adjusted that by raising the outer end of the lever R by means of the elastic flexible connection T the lug R' will open the valve $e^4$, and thus the clearance behind the piston F can be opened to the atmosphere and relieve the air-pressure generated by the actuation of the piston F at the instant of or just preceding the contact of the clamp Q with the piston-rod G, and also simultaneously with the releasing of the clamp Q from the piston-rod the piston $E^2$ is relieved from the pressure of the lug R', and the spring $S^3$ at once closes the valve $e^4$, and the spring $S^3$ being reinforced by its action by the accumulated air-pressure, which thus tends to maintain it in a closed position.

The mode of operation of this device is as follows: When the automobile to which one of these pumps is attached is running, the crown-cam forces air from behind the piston F through a flexible pipe into the air reservoir or tank, the reciprocations of the air-pump being secured by means of the cam in connection with the spring J. When the required pressure is reached, the operator actuates the lever at the seat which controls the flexible spring connection with the lever R, and by means of its connection with the latch relieves air-pressure from behind the piston, which certainly would be equal to that in the air-tank, and at the same time brings the clamp Q into frictional contact with the piston-rod with sufficient force so that when it is forced to the extremity of its throw by the cam against the tension of the spring J it is retained in that position. As air is used from the tank and the pressure decreases the operator by releasing the lever and the tension, and thus releasing the frictional contact of the latch Q from the piston-rod G, permits the pump to resume its normal operation of pumping air into the reservoir.

In order to secure a connection which shall be efficient in thus controlling the action of the pump and at the same time allow it to accommodate itself to the inequalities of distances produced by the oscillation of springs interposed between the body and the running-gear, I interpose the coiled spring $S^4$, which is sufficiently stiff to permit of the latch holding the piston-rod securely without sufficient strain to expand the spring to any great extent thereafter. The oscillations of the body and the resulting inequality of distance are taken up by the expansion and contraction of the spring without releasing the latch from its frictional contact with the piston-rod G, and thus permitting the pump to operate.

It is obvious that the crown-cam might be attached to the live axle, so as to be compelled to revolve with it in any other convenient manner. In practice, however, I found it more convenient to attach it to the bevel gear-wheel carried by the live axle and forming part of the differential gear; but I do not desire to limit myself to its connection with the differential gear in that manner.

I claim—

1. The combination of a driving-axle, a crown-cam mounted thereon, an air-pump fixedly located perpendicularly to the plane of the cam-wheel, the piston-rod thereof engaging the cam and actuating the piston of the air-pump to compress air therein, elastic means for retracting the piston and the piston-rod, a clamp adapted to frictionally engage the piston-rod, and means connected with the clamp operated by hand whereby the clamp can be brought into engagement with the piston-rod at the will of the operator, substantially as described.

2. The combination of a driving-axle, a crown-cam mounted thereon, an air-pump fixedly located perpendicularly to the plane of the cam-wheel, the piston-rod thereof engaging the cam and actuating the piston of the air-pump to compress air therein, elastic means for retracting the piston and the piston-rod, a clamp adapted to frictionally engage the piston-rod, a valve in a passage opening into the clearance-space of the pump, means for simultaneously actuating the valve and the clamp whereby the valve is opened as the clamp is brought into contact with the piston-rod, substantially as described.

3. In an automobile air-pump, the combination of a fixed axle, an air-pump mounted longitudinally thereon, a rotating axle, a crown-cam mounted on said rotating axle and adapted to frictionally engage the piston-rod of the air-pump, a spring for maintaining the piston-rod in engagement with the cam when the pump is operated, a frictional clamp adapted to compress the piston-rod and hold it against the tension of the spring and away from the cam, an automobile-body mounted upon springs located between the axle and the body and adapted to vibrate thereon, elastic means connecting the body and the clamp of sufficient tension to permit of the effective application of the clamp, and to accommodate the oscillations of the body without releasing the effective frictional contact of the clamp with the piston-rod, and means for actuating the elastic connection, substantially as described.

In testimony whereof I sign this specification in the presence of two witnesses.

JOHN G. HEAL.

Witnesses:
R. A. PARKER,
NETTIE V. BELLES.